(12) United States Patent
Zhao et al.

(10) Patent No.: US 10,917,652 B2
(45) Date of Patent: Feb. 9, 2021

(54) DATA RATE CONTROL METHOD, COMPUTER SYSTEM, AND DEVICE

(71) Applicant: SZ DJI TECHNOLOGY CO., LTD., Shenzhen (CN)

(72) Inventors: Wenjun Zhao, Shenzhen (CN); Wei Chen, Shenzhen (CN); Xiaozhen Zheng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 21 days.

(21) Appl. No.: 16/381,927

(22) Filed: Apr. 11, 2019

(65) Prior Publication Data

US 2019/0246124 A1 Aug. 8, 2019

Related U.S. Application Data

(63) Continuation of application No. PCT/CN2016/101939, filed on Oct. 12, 2016.

(51) Int. Cl.
*H04N 19/196* (2014.01)
*H04N 19/176* (2014.01)
*H04N 19/174* (2014.01)
*H04N 19/15* (2014.01)
(Continued)

(52) U.S. Cl.
CPC ......... *H04N 19/196* (2014.11); *H04N 19/115* (2014.11); *H04N 19/124* (2014.11); *H04N 19/15* (2014.11); *H04N 19/174* (2014.11); *H04N 19/176* (2014.11)

(58) Field of Classification Search
CPC .... H04N 19/115; H04N 19/124; H04N 19/15; H04N 19/174; H04N 19/176; H04N 19/196
See application file for complete search history.

(56) References Cited

U.S. PATENT DOCUMENTS 5,144,424 A * 9/1992 Savatier ............... H04N 19/197
375/240.03
5,144,426 A * 9/1992 Tanaka ................. H04N 19/159
375/240.13
(Continued)

FOREIGN PATENT DOCUMENTS

CN 1332576 A 1/2002
CN 101127909 A 2/2008
(Continued)

OTHER PUBLICATIONS

World Intellectual Property Organization (WIPO) International Search Report for PCT/CN2016/101939 dated Jul. 14, 2017 6 Pages.

*Primary Examiner* — Peter D Le
(74) *Attorney, Agent, or Firm* — Anova Law Group, PLLC

(57) ABSTRACT

A data rate control method includes determining an adjustment value of a first encoding parameter for encoding a first strip based on a quota of the first strip included in a frame that has not been encoded and based on a quota of at least one already encoded strip included in the frame. At least one of the quota of the first strip and the quota of the at least one already encoded strip relates to a number of shares of bits used for encoding a strip. The data rate control method also includes determining the first encoding parameter based on the adjustment value.

18 Claims, 7 Drawing Sheets

(51) Int. Cl.
*H04N 19/115* (2014.01)
*H04N 19/124* (2014.01)

(56) References Cited

U.S. PATENT DOCUMENTS

| | | | | |
|---|---|---|---|---|
| 5,253,075 A * | 10/1993 | Sugiyama | ............ | H04N 19/176 382/239 |
| 5,333,012 A * | 7/1994 | Singhal | ................ | H04N 19/176 375/240.04 |
| 5,561,719 A * | 10/1996 | Sugahara | ............ | H04N 19/176 375/E7.106 |
| 5,754,233 A * | 5/1998 | Takashima | ............ | H04N 19/87 348/390.1 |
| 8,594,186 B1 * | 11/2013 | Denolf | ................ | H04N 19/105 375/240.02 |
| 2002/0172280 A1 * | 11/2002 | Ducloux | ............ | H04N 19/198 375/240.12 |
| 2004/0013202 A1 * | 1/2004 | Lainema | ............ | H04N 19/126 375/240.18 |
| 2008/0225945 A1 * | 9/2008 | Wu | ........................ | H04N 19/17 375/240.03 |
| 2009/0274219 A1 * | 11/2009 | Greene | ................ | H04N 19/115 375/240.26 |
| 2010/0135386 A1 * | 6/2010 | Shibata | ................ | H04N 19/124 375/240.03 |
| 2011/0164679 A1 * | 7/2011 | Satou | ................ | H04N 19/146 375/240.03 |
| 2012/0020549 A1 * | 1/2012 | Lee | ...................... | H04N 19/124 382/154 |
| 2012/0201304 A1 | 8/2012 | Dumitras et al. | | |
| 2013/0016786 A1 | 1/2013 | Segall | | |
| 2013/0136172 A1 * | 5/2013 | Lim | ...................... | H04N 19/463 375/240.03 |
| 2013/0330012 A1 * | 12/2013 | Sato | ...................... | H04N 19/463 382/233 |
| 2013/0336399 A1 * | 12/2013 | Yu | ........................ | H04N 19/174 375/240.14 |
| 2014/0247882 A1 | 9/2014 | Misra et al. | | |
| 2014/0341276 A1 * | 11/2014 | Lee | ........................ | H04N 19/70 375/240.03 |
| 2015/0237375 A1 * | 8/2015 | Okamoto | ............. | H04N 19/124 375/240.2 |
| 2015/0296206 A1 * | 10/2015 | Thirumalai | ............ | H04N 19/15 375/240.05 |
| 2015/0304674 A1 * | 10/2015 | Lee | ..................... | H04N 21/4302 382/232 |
| 2015/0365695 A1 * | 12/2015 | Pu | ........................ | H04N 19/186 375/240.16 |
| 2016/0050414 A1 * | 2/2016 | Lee | ........................ | H04N 19/61 375/240.03 |
| 2016/0050415 A1 * | 2/2016 | Lee | ........................ | H04N 19/70 375/240.03 |
| 2016/0050416 A1 * | 2/2016 | Lee | ........................ | H04N 19/70 375/240.03 |
| 2016/0050417 A1 * | 2/2016 | Lee | ..................... | H04N 19/436 375/240.03 |
| 2017/0150150 A1 * | 5/2017 | Thirumalai | .......... | H04N 19/124 |

FOREIGN PATENT DOCUMENTS

| | | |
|---|---|---|
| CN | 101159871 A | 4/2008 |
| CN | 101340571 A | 1/2009 |
| CN | 101888556 A | 11/2010 |
| CN | 102355584 A | 2/2012 |
| CN | 102868883 A | 1/2013 |
| CN | 103391439 A | 11/2013 |
| CN | 103533359 A | 1/2014 |

* cited by examiner

DATA RATE CONTROL METHOD, COMPUTER SYSTEM, AND DEVICE

CROSS-REFERENCE TO RELATED APPLICATION

This application is a continuation application of International Application No. PCT/CN2016/101939, filed on Oct. 12, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the information technology field and, more particularly, to a data rate control method, a computer system, and a device.

BACKGROUND

The bandwidth of a communication channel in a video communication system is typically constant and limited. Data streams having variable data rates are not suitable for transmission in the constant channel. Therefore, data rate control is introduced into the video encoding for the purpose of controlling the data rate of the data stream within a predetermined oscillation range.

Effective data rate control may enable the video communication system with a limited data bandwidth to have a relatively stable transmission data rate and a relatively small video delay. Therefore, effectively controlling the data rate becomes an emerging technical issue that needs to be addressed.

SUMMARY

In accordance with the present disclosure, there is provided a data rate control method that includes determining an adjustment value of a first encoding parameter for encoding a first strip based on a quota of the first strip included in a frame that has not been encoded and based on a quota of at least one already encoded strip included in the frame, at least one of the quota of the first strip and the quota of the at least one already encoded strip relating to a number of shares of bits used for encoding a strip. The data rate control method also includes determining the first encoding parameter based on the adjustment value.

In accordance with the present disclosure, there is also provided a computer system. The computer system includes a storage device configured to store computer-executable instructions. The computer system also includes a processor configured to access the storage device and to execute the computer-executable instructions to perform a plurality of operations. The operations include determining an adjustment value of a first encoding parameter for encoding a first strip based on a quota of the first strip included in a frame that has not been encoded and a quota of at least one already encoded strip included in the frame, at least one of the quota of the first strip and the quota of the at least one already encoded strip relating to a number of shares of bits used for encoding a strip. The operations also include determining the first encoding parameter based on the adjustment value.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Figure 1:
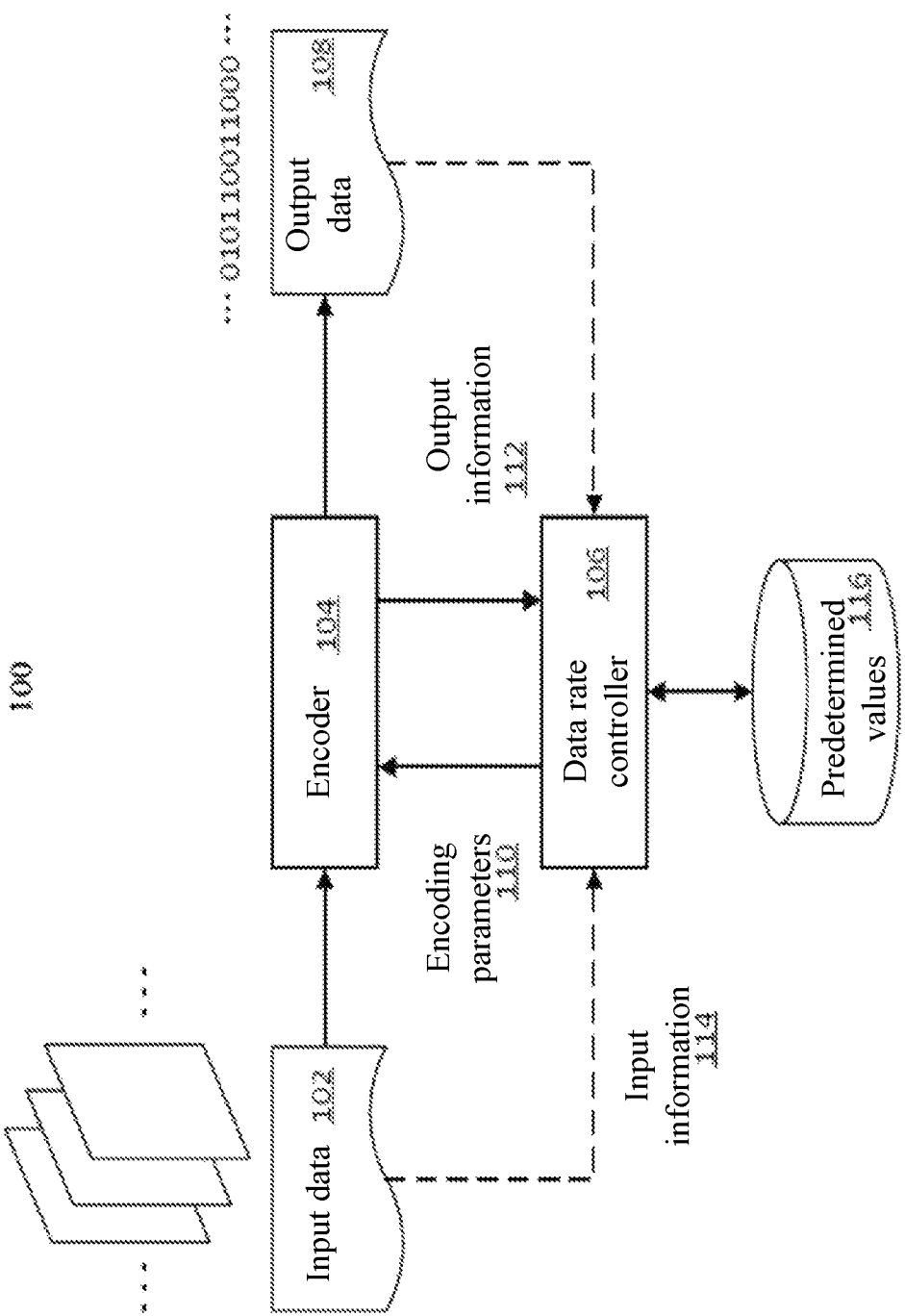
FIG. 1 is a schematic diagram of a system for implementing the disclosed technical solution, according to an example embodiment.

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

It is understood that embodiments described below are only for a person having ordinary skills in the art to better understand the technical solutions provided in the present disclosure, and are not intended to limit the scope of the present disclosure.

It should also be understood that the equations shown in the below embodiments are for illustration only, and are only examples of the technical solutions of the present disclosure. The equations do not limit the scope of the present disclosure. The equations may have variations. Such variations of the disclosed equations also fall within the scope of the present disclosure.

Further, it should be understood that in various embodiments of the present disclosure, the reference numbers of the steps do not necessarily mean that the steps have to be executed in the order of the reference numbers. The order for executing the steps should be configured based on the functions of the steps and the internal logic. Thus, the reference numbers of the steps do not limit, in any manner, the execution of the various steps of the disclosed embodiments.

Example embodiments will be described with reference to the accompanying drawings, in which the same numbers refer to the same or similar elements unless otherwise specified.

The term "if" or "when" followed by a condition may be interpreted as "based on a determination that" the listed condition is satisfied.

It should be understood that in the present disclosure, relational terms such as first and second, etc., are only used to distinguish an entity or operation from another entity or operation, and do not necessarily imply that there is an actual relationship or order between the entities or operations. The terms "comprising," "including," or any other variations are intended to encompass non-exclusive inclusion, such that a process, a method, an apparatus, or a device having a plurality of listed items not only includes these items, but also includes other items that are not listed, or includes items inherent in the process, method, apparatus, or device. Without further limitations, an item modified by a term "comprising a . . . " does not exclude inclusion of another same item in the process, method, apparatus, or device that includes the item.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The technical solutions of the present disclosure may be used to control the data rate of a video or other media data. For example, under the condition that the number of shares of bits generated by encoding each frame of a sequence of videos cannot be greater than a predetermined number of shares of bits, the technical solution of the present disclosure can realize data rate control at one time without requiring pre-processing.

In various embodiments of the present disclosure, the predetermined number of shares of bits that each encoded frame cannot exceed is also referred to as an allocated number of shares of bits for the frame or a number of shares of bits that the frame may use.

FIG. 1 is a schematic diagram of a system 100 for implementing the technical solutions of the present disclosure. As shown in FIG. 1, the system 100 may receive and encode input data 102 to generate output data 108. For example, the system 100 may receive video data, compress the video data to generate a compressed bit stream. In the process of data encoding, the system may use the technical solutions of the present disclosure to control the data rate of encoding the data. In some embodiments, the system 100 may include one or more processors. Each of the one or more processors may include a processor for a computing device, or a processor for a movable device (e.g., an unmanned aerial vehicle). The processor may include an Advanced RISC (reduced instruction set computer) Machine ("ARM") processor, a field-programmable gate array ("FPGA"), a central processing unit ("CPU"), a graphics processing unit ("GPU"), etc.

As shown in FIG. 1, the system 100 may include an encoder 104 and a data rate controller 106. The encoder 104 and the data rate controller 106 may be implemented using the same or different computing devices. In some embodiments, the data rate controller 106 may be an integral part of the encoder 104. In some embodiments, the encoder 104 may be an integral part of the data rate controller 106. In some embodiments, the encoder 104 may be configured to receive the input data 102, to encode the input data 102, and to generate the output data 108 that include the encoded input data. The input data 102 may include texts, images, graphic objects, animation sequences, audios, videos, or any other data that need to be encoded. In some embodiments, the input data 102 may be include sensor data provided by one or more sensors. The one or more sensors may include a vision sensor (e.g., a camera, an infrared sensor), a microphone, a near-field sensor (e.g., an ultrasound sensor, a radar), a position sensor, a temperature sensor, a touch sensor, etc. In some embodiments, the input data 102 may include information provided by a user, such as biological information. The biological information may include facial features, fingerprint scan, retina scan, voice recording, DNA sample, etc.

Encoding is often needed for highly efficient and/or secure data transmission or storage. Encoding of the input data may include data compression, data encryption, error correction encoding, format conversion, etc. For example, compressing multimedia data (e.g., video or audio) may reduce the number of shares of bits transmitted in a network. Sensitive data, such as financial information and personal identification information, may be encrypted before transmission and/or storage to protect confidential information and/or privacy.

A person having ordinary skills in the art can appreciate that any suitable encoding techniques may be used to encode the input data. The type of encoding depends on the data to be encoded and the specific encoding needs.

In some embodiments, the encoder 104 may realize one or more different types of encoding and/or decoding devices. Different encoding and/or decoding devices may implement different encoding and/or decoding codes, instructions, or computer programs. Based on various factors, such as the type and/or sources of the input data, the receiving entity of the encoded data, available computing resources, network environment, commercial environment, rules, and standards, etc., a suitable encoder to encode a set of input data.

For example, the encoder 104 may be configured to encode a series of video frames. Encoding data included in each frame may include a series of steps. In some embodiments, encoding may be based on the spatial information included in the frame. In some embodiments, the encoding steps may include conversion steps, quantization steps, and entropy encoding steps.

As shown in FIG. 1, in some embodiments, the data rate controller 106 may control the data rate of the output data through providing one or more encoding parameters 110 to the encoder 104. The data rate may be controlled within a predetermined range (e.g., lower than a maximum data rate, higher than a minimum data rate, etc.). or close to a target average data rate. In some embodiments, the data rate may be controlled to change based on the complexity of the frame, the limit on the bandwidth, a capacity of a cache, or other factors. In some embodiments, the data rate control may include one or more levels, such as group of picture ("GOP") level, frame level, strip level, macroblock level, block level, and pixel level, etc.

In some embodiments, the encoding parameters may include one or more quantization parameters for controlling the quantization steps in the encoding procedure. The encoding parameters may control the data rate of the output data. For example, the quantization parameters may include a quantization step size, a value indicating the quantization step size or related to the quantization step size. For example, quantization parameters may include quantization parameters ("QP") used in H.264 or other similar encoders, quantization matrix, or corresponding reference matrix, etc. Encoding parameters may also include other parameters for controlling other aspects of the encoding procedure.

In some embodiments, the data rate controller 106 may control the data rate based on output information 112 relating to the output data 108 or the encoder 104. In some embodiments, the data rate controller 106 may control the data rate based on input information 114 relating to the input data 102.

In some embodiments, the data rate controller 106 may control the data rate based on one or more data rate control predetermined values 116.

The predetermined values may be pre-set or may be dynamically updated. The predetermined values may be used to obtain the encoding parameters.

In some embodiments, the data rate controller 106 may control the data rate based on other auxiliary information.

Figure 2:
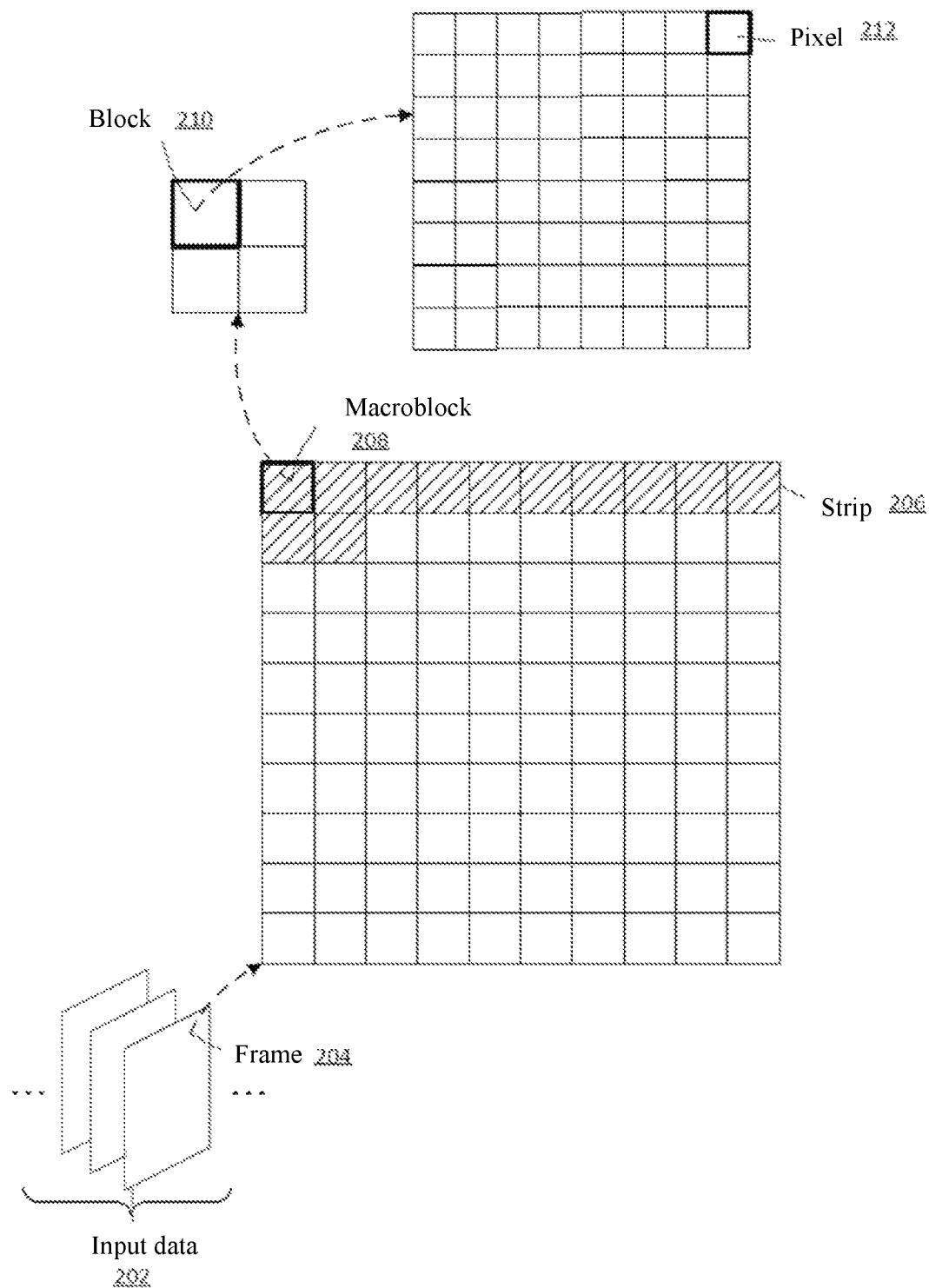
FIG. 2 is a schematic illustration of input data, according to an example embodiment.

FIG. 2 schematically illustrates the input data.

As shown in FIG. 2, the input data 202 may include a plurality of frames 204. The plurality of frames 204 may include consecutive image frames included in a video stream. Each frame 204 may include one or more strips 206. Each strip 206 may include one or more macroblocks 208. Each macroblock 208 may include one or more blocks 210. Each block 210 may include one or more pixels 212. Each pixel 212 may include one or more data sets corresponding to one or more data portions, such as brightness data portions and chroma data portion. A data unit may be a frame, a strip, a macroblock, a block, a pixel, or any combination thereof. In different embodiments, the size of the data units may change. For example, a frame 204 may include 100 strips 206, each strip 206 may include 10 macroblocks 208, each macroblock 208 may include 4 (e.g., 2×2) blocks 210, and each block 210 may include 64 (e.g., 8×8) pixels 212.

Strips are used to explain the technical solutions in below discussions. It is understood that the strips in below discussions of the technical solutions may be replaced by other data units, such as macroblocks, blocks, etc. The present disclosure does not limit the data units.

Figure 3:
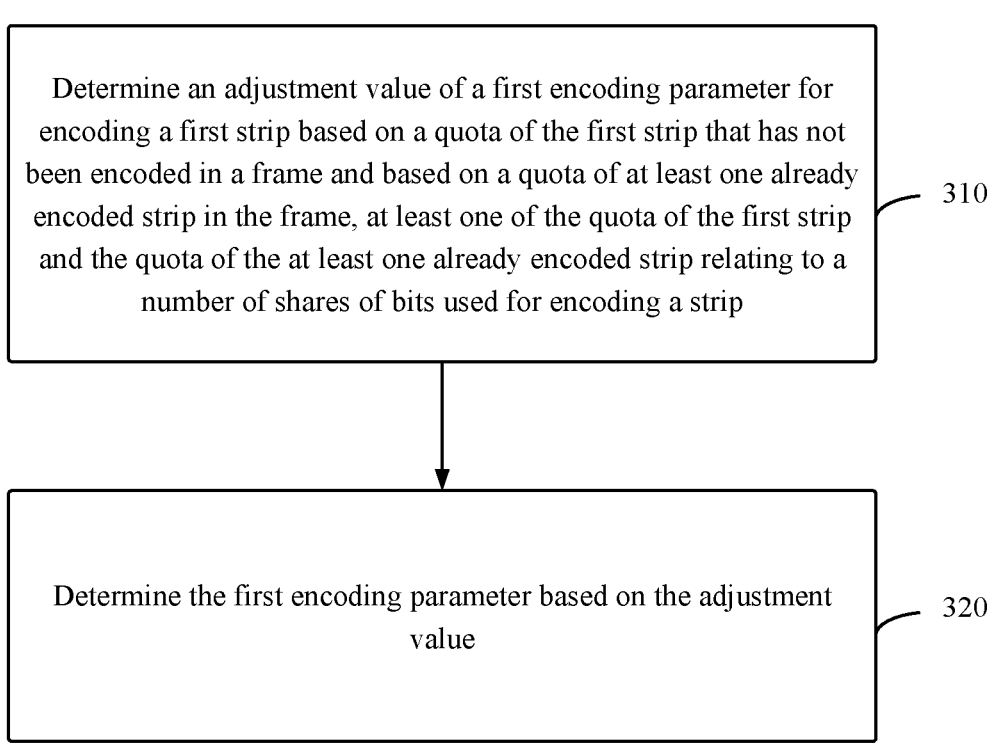
FIG. 3 is a flow chart illustrating a method for controlling the data rate, according to an example embodiment.

FIG. 3 is a flow chart illustrating a method 300 for controlling the data rate. Method 300 may be executed by the system 100 of FIG. 1. For example, the data rate controller 106 shown in FIG. 1 may execute method 300.

Method 300 may include Step 310: determining an adjustment value of a first encoding parameter for encoding a first strip based on a quota of the first strip included in a frame that has not been encoded and based on a quota of at least one already encoded strip included in the frame, at least one of the quota of the first strip and the quota of the at least one already encoded strip relating to the number of shares of bits used for encoding a strip.

In some embodiments, the quota relates to the number of shares of bits used for encoding a strip. In other words, the number of shares of bits used for encoding a specific strip relates to the quota of the strip. For example, if the quota of a specific strip is N, then encoding the strip may use N shares of bits. The number of bits included in a share of bits will be described below.

In some embodiments, a first strip indicates a strip to be encoded. A first encoding parameter indicates an encoding parameter used for encoding the first strip. For the first strip, an adjustment value may be determined for the first encoding parameter based on a first quota of the first strip and a second quota of at least one already encoded strip. The adjustment value may be used to determine the first encoding parameter. In other words, in some embodiments, the encoding parameter for encoding the first strip may be based on the first quota of the first strip and the second quota of at least one already encoded strip included in the frame.

In some embodiments, the encoding parameter may include a quantization parameter. The encoding parameter has been described above.

Figure 4:
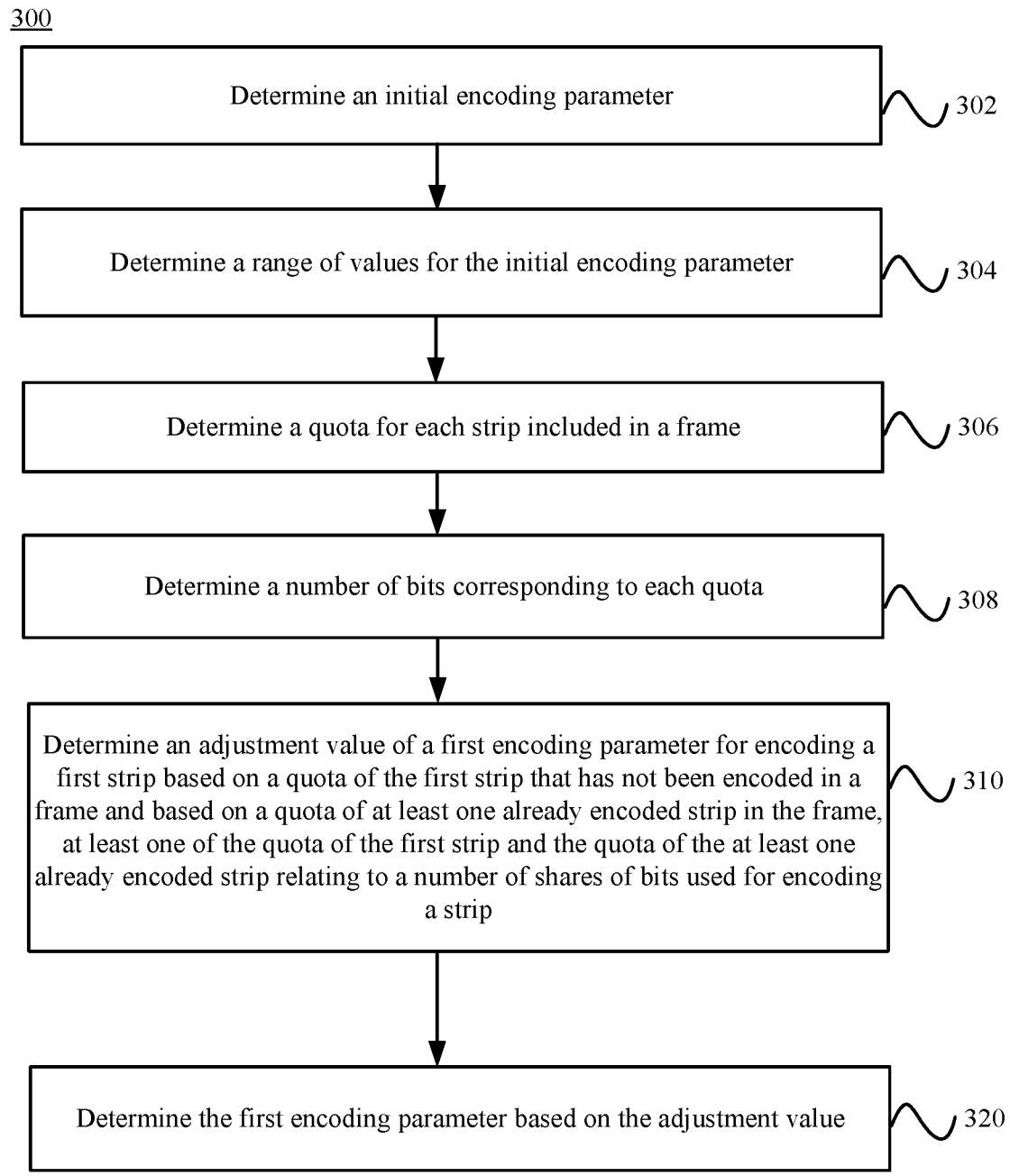
FIG. 4 is a flow chart illustrating another method for controlling the data rate, according to an example embodiment.

In some embodiments, as shown in FIG. 4, before Step 310, the method may also include:

Step 306, determining a quota for each strip included in a frame.

The present disclosure does not limit the method for determining the quota for each strip. For example, the quota of each strip may relate to the characteristics of the data of the strip, or may relate to specific information.

In some embodiments, the quota of each strip may be determined based on characteristics of the data of each strip included in the frame.

In some embodiments, the quota of a strip may relate to the characteristics of the data of the strip. The characteristics of the data may include, but not be limited to, complexity, interestingness, texture degree, etc. In some embodiments, the quota of each strip and the characteristics of the data of each strip may have a forward mapping relationship. For example, the higher the complexity of the strip, the larger the quota.

In some embodiments, information relating to the complexity may be obtained based on an image processing method. For example, the complexity of an image may be assessed based on relevant gradient values obtained through a Sobel algorithm. In some embodiments, the complexity of the image may be determined based on a high-frequency component magnitude obtained using a Roberts algorithm. In some embodiments, the complexity of the image may be determined based on an edge magnitude obtained using an edge detection algorithm.

In some embodiments, the strip may be classified based on one of the following classification methods:

If an average value of the complexities of strips included in a strip row of a frame is greater than a predetermined value N1, and if the number of strips included in the strip row that have complexities greater than a predetermined value N2, then the strip row is a noise strip row, and each strip included in the strip row is a noise strip;

Otherwise, the strip row is a non-noise strip row, and each strip included in the non-noise strip row is a non-noise strip;

If a complexity of a strip included in a non-noise strip row is greater than a predetermined value N4, and N4 is not less than N2, then the strip is a non-noise strip having regular high-frequency components;

If the complexity of each strip included in a non-noise strip row is 0, then the non-noise strip row is a zero strip row, and each strip included in the zero strip row is a zero strip.

It is understood that the above classification methods are examples only, and do not limit the scope of the present disclosure. In other words, other classification methods may also be used to classify the strips.

In some embodiments, a quota of each strip may be determined based on a location of the strip in the frame or based on pre-configured information.

In some embodiments, the quota of a strip may be determined based on the location of the strip in the frame. For example, the quota may be determined based on whether the location where the strip is located is a key area of the image. In some embodiments, the quota of the strip may be determined based on pre-configured information. For example, which strips are associated with high quotas and which strips are associated with low quotas may be predetermined.

In some embodiments, using complexity as an example, the quota of a noise strip of a frame may be determined using equation (1):

$$Quota_i = staData_i * M_1 / sumStaDataNoise \qquad (1)$$

In equation (1), $Quota_i$ is the quota of the ith noise strip in the frame, $staData_i$ is the complexity of the ith strip, sumStaDataNoise is the sum of the complexities of all of the noise strips in the frame, and $M_1$ is a predetermined value.

In some embodiments, the quota for a non-noise strip in a frame may be determined based on equation (2):

$$Quota_j = staData_j * M_2 / sumStaDataNonNoise \qquad (2)$$

In equation (2), $Quota_j$ is the quota of the jth non-noise strip of the frame, $staData_j$ is the complexity of the jth strip, sumStaDataNonNoise is the sum of the complexities of all of the non-noise strips of the frame, and $M_2$ is a predetermined value.

In some embodiments, when the quota $Quota_j$ of the jth non-noise strip of the frame is greater than a predetermined value, $Quota_j$ may be set as the predetermined value. In other words, if a quota of a non-noise strip obtained based on equation (2) is large, the quota may be set as the predetermined value, such that the quotas of the non-noise strips are not too large (i.e., are less than a predetermined value).

In some embodiments, after determining the quotas of the strips, the number of shares of bits corresponding to the quota may be determined, as described below.

In some embodiments, as shown in FIG. 4, method 300 may include:

Step 308, determining a number bits corresponding to each quota.

In some embodiments, when a frame includes noise strips, the number of bits corresponding to each quota of the noise strip of the frame may be determined based on a number of bits that can be used for encoding all of the noise strips of the frame in the allocated number of bits assigned to the frame, a sum of the quotas of all of the noise strips of the frame, and a number of strips in the noise strips of the frame that have a zero quota;

In some embodiments, when the frame includes noise strips, the number of bits corresponding to each quota of a non-noise strip of the frame may be determined based on a number of bits that may be used for encoding all of the non-noise strips of the frame in the allocated number of bits assigned to the frame, a sum of the quotas of all of the non-noise strips of the frame, and a number of strips in the non-noise strips of the frame that have a zero quota.

In some embodiments, when a frame includes one or more noise strips, the number of bits allocated to the frame may be divided into a first number of bits that may be used for encoding all of the noise strips of the frame, and a second number of bits that may be used for encoding all of the non-noise strips of the frame. A ratio between the first number and the second number may relate to a ratio between a sum of the complexities of all of the noise strips of the frame and a sum of the complexities of the non-noise strips of the frame. A number of bits corresponding to each quota of a noise strip and a number of bits corresponding to each quota of a non-noise strip may relate to the first number of bits that may be used for encoding all of the noise strips of the frame and the second number of bits that may be used for encoding all of the non-noise strips of the frame, respectively.

In some embodiments, a number of bits corresponding to each quota of a noise strip included in a frame may be calculated in equation (3):

$$size4Noise / (sumQuotaNoise + numQuota0Noise) \qquad (3)$$

In equation (3), size4Noise is the first number of bits that may be used for encoding all of the noise strips of the frame in the allocated number of bits assigned to the frame, sumQuotaNoise is a sum of the quotas of all of the noise strips of the frame, numQuota0Noise is a number of strips in the noise strips of the frame that have a zero quota.

In some embodiments, a number of bits corresponding to each quota of a non-noise strip of the frame may be determined in equation (4):

$$size4NonNoise / (sumQuotaNonNoise + numQuota0NonNoise) \qquad (4)$$

In equation (4), size4NonNoise is the number of bits that may be used for encoding all of the non-noise strips of the frame in the allocated number of bits assigned to the frame, sumQuotaNonNoise is the sum of the quotas of all of the non-noise strips of the frame, and numQuota0NonNoise is the number of strips in the non-noise strips of the frame that have a zero quota.

In some embodiments, when the frame does not include a noise strip, a number of bits corresponding to each quota may be determined based on an allocated number of bits assigned to the frame, a sum of the quotas of all of the non-noise strips of the frame, and a number of strips in the non-noise strips of the frame that have a zero quota.

In some embodiments, when the frame does not include a noise strip, the number of bits corresponding to each quota may be determined in equation (5):

$$sizeTotal / (sumQuotaNonNoise + numQuota0NonNoise) \qquad (5)$$

In equation (5), sizeTotal is the allocated number of bits assigned to the frame, sumQuotaNonNoise is the sum of quotas of all of the non-noise strips of the frame, numQuota0NonNoise is the number of strips of the non-noise strips of the frame that have a zero quota.

In some embodiments, when the frame does not include a noise strip, the number of bits corresponding to each quota may be determined as follows:

when the frame does not include a noise strip, a number of bits used for encoding each zero strip included in a zero strip row of a frame may be set as a predetermined value; and a number of bits corresponding to each quota may be determined based on the allocated number of bits assigned to the frame, the number of bits used for encoding by the zero strips in all of the zero strip rows of the frame, the number of zero strips included in the zero strip rows of the frame, a sum of the quotas of all of the non-noise strips of the frame, and the number of strips in the non-noise strips of the frame that have a zero quota.

In some embodiments, when the frame does not include a noise strip, the number of bits corresponding to each quota may be determined in equation (6):

$$\text{remSize}/(\text{sumQuotaNonNoise}+\text{numQuota0NonNoise}-\text{numZeroSlice}) \quad (6)$$

In equation (6), remSize is a number of bits remaining in the allocated number of bits assigned to the frame after deducting the number of bits used for encoding by the zero strips of all of the zero strip rows in the frame, numZeroSlice is the number of zero strips included in the zero strip rows of the frame, sumQuotaNonNoise is a sum of the quotas of the non-noise strips of the frame, and numQuota0NonNoise is the number of strips of the non-noise strips of the frame that have a zero quota.

In some embodiments, the method indicated in equation (6) may be adopted when the frame satisfies one of the following conditions:

A quota of a strip is greater than or equal to a predetermined value;

In a non-zero strip row, there is at least one strip having a zero quota;

A number of strips having 0 complexity is greater than a predetermined value.

If all of the above conditions are not satisfied, the method indicated in equation (5) may be used.

The above describes the quota of a strip, and methods for determining the number of bits corresponding to each quota. Methods for determining an adjustment value are described below.

In some embodiments, the adjustment value may be determined based on a first quota of a first strip and a second quota of at least one already encoded strip adjacent the first strip in the frame.

In some embodiments, the at least one already encoded strip may be a strip near or adjacent the first strip. The present disclosure, however, does not limit the at least one already encoded strip.

In some embodiments, the adjustment value may be determined based on the first quota of the first strip and the second quota of at least one already encoded strip that is next to the first strip in the frame.

In other words, in some embodiments, the at least one already encoded strip is a strip next to the first strip in the frame.

In some embodiments, the at least one already encoded strip is related to a sequence of encoding. For example, when the sequence of encoding is from left to right, from top to bottom, the at least one already encoded strip may be a strip located to the left of the first strip, above the first strip, or at the left upper corner of the first strip. When the sequence of encoding is from right to left, from bottom to top, then the at least one already encoded strip may be a strip located to the right of the first strip, below the first strip, or at the right lower corner of the first strip. For the purpose of convenient descriptions, the following sequence of encoding is from left to right, from top to bottom. When other sequences of encoding are used, the following descriptions may be modified accordingly by a person having ordinary skills in the art.

In some embodiments, when at least one of a strip located to the left of the first strip and a strip located above the first strip satisfies a first condition, then the adjustment value may be determined based on a quota of the first strip and a quota of at least one of the strip located to the left of the first strip and the strip located above the first strip.

In some embodiments, when the strip located to the left of the first strip satisfies the first condition, it indicates that the first strip is not the very first strip (or number one strip) in the strip row in which the first strip is located.

In some embodiments, when the strip located above the first strip satisfies the first condition, it indicates that the strip row in which the first strip is located is not the very first (or number one) strip row in the frame, and when the first strip is a non-noise strip, the strip row located above the first strip is a non-noise strip row; or when the first strip is a noise strip, the strip row located above the first strip is a noise strip row.

In some embodiments, a strip satisfying the first condition means that the strip may be usable, i.e., the strip may be adopted or used. In some embodiments, when at least one of the strip located to the left of the first strip and the strip located above the first strip is usable, the adjustment value may be determined based on the quota of the first strip and the quota of the usable strip.

In some embodiments, when at least one of the strip located to the left of the first strip and the strip located above the first strip satisfies the first condition, the adjustment value may be determined using the following methods:

If the quota of the first strip is 0, and if the quota of the strip located to the left of the first strip and the quota of the strip above the first strip are not 0, the adjustment value may be determined to be a first predetermined value.

When the number of bits used by already encoded strips in the frame is greater than the number of bits allocated to the already encoded strips in the frame, the first predetermined value is greater than 0; when the number of bits used by already encoded strips in the frame is not greater than the number of bits allocated to the already encoded strips in the frame, the first predetermined value is not greater than 0.

If the quota of the first trip is not 0, and if the quota of the strip located to the left of the first strip and the quota of the strip above the first strip are both 0, the adjustment value may be determined to be a second predetermined value.

When the number of bits used by already encoded strips in the frame is greater than the number of bits allocated to the already encoded strips in the frame, the second predetermined value is greater than 0; when the number of bits used by already encoded strips in the frame is not greater than the number of bits allocated to the already encoded strips in the frame, the second predetermined value is not greater than 0.

If the quota of the first strip is not 0, and at least one of the strip located to the left of the first strip and the strip located above the first strip has a quota that is not 0, the adjustment value may be determined based on the number of bits used, quota of the first strip, and the non-zero quota of at least one of the strip located to the left of the first strip and the strip located above the first strip.

In some embodiments, when the quotas of the strip located to the left of the first strip and the strip located above the first strip are both not 0, an encoding parameter predicted value may be determined based on the quota of the first strip, the number of bits that may be used for encoding the first strip, the quotas of and the numbers of bits used by the strip located to the left of the first strip and the strip located above the first strip, and encoding parameters for encoding the strip located to the left of the first strip and the strip located above the first strip.

In some embodiments, the encoding parameter predicted value may be determined based on equation (7):

$$\text{nextQIdx}=\text{predQIdx}*\text{predSize}/\text{alloSize} \quad (7)$$

In equation (7), alloSize is the number of bits that may be used for encoding the first strip. When the quota of the first strip is not 0, the number of bits that may be used for encoding the first strip may be equal to the quota of the first strip multiplied by the number of bits corresponding to each quota.

When the quota of the strip located to the left of the first strip and the quota of the strip above the first strip are both not 0, the variables of predSize and predQIdx in equation (7) may be determined using equations (8)-(11):

$$predSizeT = sizeT * quotaC/quotaT \quad (8)$$

$$predSizeL = sizeL * quotaC/quotaL \quad (9)$$

$$predSize = (predSizeT + predSizeL)/2 \quad (10)$$

$$predQIdx = (qIdxT + qIdxL)/2 \quad (11)$$

In equations (8)-(11), quotaC, quotaL, and quotaT are the quotas of the first strip, the strip located to the left of the first strip, and the strip located above the first strip, respectively. The variables qIdxL and qIdxT are the encoding parameters for encoding the strip located to the left of the first strip and for encoding the strip located above the first strip, respectively, the variables sizeL and sizeT are the numbers of bits used by the strip located to the left of the first strip and the strip located above the first strip, respectively.

In some embodiments, when the quota of the strip located to the left of the first strip is not 0, and the quota of the strip located above the first strip is 0, the encoding parameter predicted value may be determined based on the quota of the first strip, the number of bits that may be used by the first strip, the quota of and the number of bits used by the strip located to the left of the first strip, and the encoding parameter used for encoding the strip located to the left of the first strip.

In some embodiments, when the quota of the strip located to the left of the first strip is not 0, and when the quota of the strip located above the first strip is 0, the variables predSize and predQIdx in equation (7) may be determined in equations (12)-(14):

$$predSize = predSizeL \quad (12)$$

$$predSizeL = sizeL * quotaC/quotaL \quad (13)$$

$$predQIdx = qIdxL \quad (14)$$

In some embodiments, when the quota of the strip located above the first strip is not 0, and the quota of the strip located to the left of the first strip is 0, the encoding parameter predicted value may be determined based on the quota of the first strip, the number of bits that may be used by the first strip, the quota of and the number of bits used by the strip located above the first strip, and the encoding parameter used for encoding the strip located above the first strip.

In some embodiments, when the quota of the strip located above the first strip is not 0, and when the quota of the strip located to the left of the first strip is 0, the variables predSize and predQIdx in equation (7) may be determined in equations (15)-(17):

$$predSize = predSizeT \quad (15)$$

$$predSizeT = sizeT * quotaC/quotaT \quad (16)$$

$$predQIdx = qIdxT \quad (17)$$

In some embodiments, after obtaining the encoding parameter predicted value, the adjustment value may be determined based on the encoding parameter predicted value and a second encoding parameter used for encoding a second strip. The second strip may be the last strip that has been encoded in the frame.

In some embodiments, the adjustment value may be determined in equation (18):

$$qIdxDelta = nextQIdx - preQIdx \quad (18)$$

In equation (18), qIdxDelta is the adjustment value, preQIdx is the second encoding parameter, nextQIdx is the encoding parameter predicted value.

In some embodiments, when the quota of the first strip is 0, and at least one of the strip located to the left of the first strip and the strip located above the first strip has a quota that is 0, the adjustment value may be determined based on the number of bits used by at least one of the strip located to the left of the first strip and the strip located above the first strip that has a zero quota.

In some embodiments, when the quotas of the strip located to the left of the first strip and the strip located above the first strip are both 0, the encoding parameter predicted value may be determined based on the number of bits that may be used by the first strip, the number of bits used by the strip located to the left of the first strip and the strip located above the first strip, and the encoding parameter used for encoding the strip located to the left of the first strip and the strip located above the first strip.

In some embodiments, the encoding parameter predicted value may be determined based on equation (7). When the quota for the first strip is 0, the number of bits that may be used by the first strip, alloSize, may be the number of bits corresponding to one share of the quota or may be a predetermined number of bits.

In some embodiments, when the quotas of the strip located to the left of the first strip and the strip located above the first strip are both 0, the variables predSize and predQIdx used in equation (7) may be determined in equations (19)-(22):

$$predSizeT = sizeT \quad (19)$$

$$predSizeL = sizeL \quad (20)$$

$$predSize = (predSizeT + predSizeL)/2 \quad (21)$$

$$predQIdx = (qIdxT + qIdxL)/2 \quad (22)$$

In some embodiments, when the quota for the strip located to the left of the first strip is 0, and the quota for the strip located above the first strip is not 0, the encoding parameter predicted value may be determined based on the number of bits that may be used by the first strip, the number of bits used by the strip located to the left of the first strip, and the encoding parameter used for encoding the strip located to the left of the first strip.

In some embodiments, when the quota of the strip located to the left of the first strip is 0, and the quota for the strip located above the first strip is not 0, the variables predSize and predQIdx used in equation (7) may be determined in equations (23)-(25):

$$predSize = predSizeL \quad (23)$$

$$predSizeL = sizeL \quad (24)$$

$$predQIdx = qIdxL \quad (25)$$

In some embodiments, when the quota for the strip located above the first strip is 0, and the quota for the strip located to the left of the first strip is not 0, the encoding parameter predicted value may be determined based on the number of bits that may be used by the first strip, the number of bits used by the strip located to the left of the first strip, and the encoding parameter used for encoding the strip located above the first strip.

In some embodiments, when the quota for the strip located above the first strip is 0, and the quota for the strip located to the left of the first strip is not 0, the variables predSize and predQIdx in equation (7) may be determined in equations (26)-(28):

$$predSize=predSizeT \qquad (26)$$

$$predSizeT=sizeT \qquad (27)$$

$$predQIdx=qIdxT \qquad (28)$$

In some embodiments, after obtaining the encoding parameter predicted value, the adjustment value may be determined based on the encoding parameter predicted value and the second encoding parameter used for encoding the second strip. For example, the adjustment value may be determined in equation (18).

In some embodiments, when the number of bits used by already encoded strips in the frame is greater than the number of bits allocated to the already encoded strips in the frame, the adjustment value is greater than 0; when the number of bits used by the already encoded strips in the frame is smaller than the number of bits allocated to the already encoded strips in the frame, the adjustment value is smaller than 0.

In other words, in a frame, if the number of bits accumulated by the already encoded strips exceeds the number of bits allocated to these strips, then the adjustment value is greater than 0; if the number of bits accumulated by the already encoded strips is smaller than the number of bits allocated to these strips, then the adjustment value is smaller than 0.

Referring to FIG. 3, method 300 may also include:

Step 320: determining the first encoding parameter based on the adjustment value.

In some embodiments, after obtaining the adjustment value, the encoding parameter used for encoding the first strip may be determined based on the adjustment value.

In some embodiments, the first encoding parameter may be determined based on the adjustment value and the second encoding parameter. The second encoding parameter may be an encoding parameter for encoding the second strip. The second strip may be the last already encoded strip in the frame.

In some embodiments, the first encoding parameter may be a sum of the second encoding parameter and the adjustment value, as shown in equation (29):

$$qIdx=preQIdx+qIdxDelta \qquad (29)$$

In equation (29), qIdx is the first encoding parameter, preQIdx is the second encoding parameter, qIdxDelta is the adjustment value.

In some embodiments, when the number of strips having not been encoded in the frame is not greater than a predetermined value, and when the number of bits used by already encoded strips in the frame is greater than the number of bits allocated to the already encoded strips in the frame, then the first encoding parameter may be determined as a sum of the second encoding parameter, the adjustment value, and a predetermined value that is greater than 0, as shown in equation (30):

$$qIdx=preQIdx+N+qIdxDelta \qquad (30)$$

In equation (30), qIdx is the first encoding parameter, preQIdx is the second encoding parameter, N is the predetermined value that is greater than 0, qIdxDelta is the adjustment value.

In some embodiments, when the first encoding parameter is out of the range of values for the encoding parameters, the first encoding parameter may be limited to obtain a value within the range of values for the encoding parameters.

In some embodiments, the encoding parameters may be limited within the range of values. If the first encoding parameter obtained using the above-describes methods is out of the range of values for the encoding parameters, the first encoding parameter may be limited to obtain a value within the range of values for the encoding parameters.

In some embodiments, initial values may be set for the encoding parameters and the range of values for the encoding parameters. The encoding parameter may be adjusted using the above-described methods. The range of values for the encoding parameters may also be adjusted.

In some embodiments, as shown in FIG. 4, method 300 may also include:

Step 302: determining an initial encoding parameter.

The present disclosure does not limit the methods for determining the initial encoding parameters. For example, the initial encoding parameters may be determined based on the characteristics of the data.

In some embodiments, for a non-noise strip in the frame, the initial encoding parameter may be determined based on an average value of the complexities of all of the non-noise strips in the frame. The smaller the average value of the complexities, the smaller the initial encoding parameter. In some embodiments, when the average value of the complexities is greater than a predetermined value, if the frame includes a non-noise strip having regular high-frequency components, then the initial encoding parameter may be determined as a predetermined value N5; if the frame does not include a non-noise strip having regular high-frequency components, the initial encoding parameter may be determined as a predetermined value N6, where N6 may be greater than N5.

In some embodiments, for a noise strip in the frame, the initial encoding parameter may be determined as a predetermined value N7, where N7 may not be smaller than N6.

In some embodiments, as shown in FIG. 4, method 300 may also include:

Step 304: determining a range of values for the initial encoding parameter; in other words, determining the initial values for the range of values for the encoding parameter.

In some embodiments, the range of values for the initial encoding parameter may be determined based on the initial encoding parameter.

In some embodiments, an upper limit for the range of values for the initial encoding parameter may be determined in equation (31):

$$maxQIdx=qIdx_0+delta1 \qquad (31)$$

A lower limit for the range of values for the initial encoding parameter may be determined in equation (32):

$$minQIdx=qIdx_0-delta2 \qquad (32)$$

In equations (31) and (32), maxQIdx and minQIdx are the upper limit and the lower limit of the range of values for the initial encoding parameter, $qIdx_0$ is the initial encoding parameter, delta1 and delta2 are constants greater than 0.

In some embodiments, when a strip located to the left of a unencoded strip (referred to as a third strip) and a strip located above the third strip satisfy a second condition, a third encoding parameter for encoding the third strip is determined as the initial encoding parameter.

In some embodiments, when the strip located to the left of the third strip satisfies the second condition, it indicates that the third strip is the very first (number one) strip in the strip row in which the third strip is located.

In some embodiments, when the strip located above the third strip satisfies the second condition, it indicates that the strip row in which the third strip is located is the very first strip row in the frame; or when the third strip is a non-noise strip, the strip row located above the third strip is a noise strip row; or when the third strip is a noise strip, the strip row located above the third strip is a non-noise strip row.

In some embodiments, contrary to the first condition, a strip satisfying the second condition means the strip is not usable or adoptable. When both of the strip located to the left of a specific strip and the strip located above the specific strip are not usable, the encoding parameter for encoding the specific strip may use the initial encoding parameter.

As such, the encoding parameter for encoding each strip may be obtained or determined based on a combination of the initial encoding parameter and the methods described above for determining the encoding parameter based on the adjustment value.

In some embodiments, the range of values for the encoding parameters that limits the value of the encoding parameter to be determined may be adjusted.

In some embodiments, the range of values for the encoding parameters may be adjusted based on a result of encoding.

In some embodiments, during the encoding process of a frame, if there is a continuous occurrence of the situation where the number of bits used by already encoded strips is smaller than the number of bits allocated to the already encoded strips in the frame, then the lower limit of the range of values for the encoding parameters may be reduced by a predetermined value. In some embodiments, a sum of reductions taken for the lower limit of the range of values during the encoding process of the frame is not greater than a predetermined value.

In some embodiments, during the encoding process of a frame, if there is a continuous occurrence of the situation where the number of bits used by already encoded strips is greater than the number of bits allocated to the already encoded strips in the frame, then the upper limit of the range of values for the encoding parameters may be increased by a predetermined value. In some embodiments, a sum of increases taken for the upper limit of the range of values during the encoding process of the frame is not greater than a predetermined value.

In some embodiments, if the number of bits used by the already encoded strips in the frame is greater than the number of bits allocated to the already encoded strips in the frame, then a component corresponding to a predetermined high-frequency parameter in the first strip is removed when encoding the first strip.

In some embodiments, when the number of bits generated by the encoding is too large, when during the encoding of a next strip, based on pre-set parameters, certain high-frequency parameter may be cut off (i.e., the high-frequency parameter may be treated as 0), and is not encoded.

Figure 5:
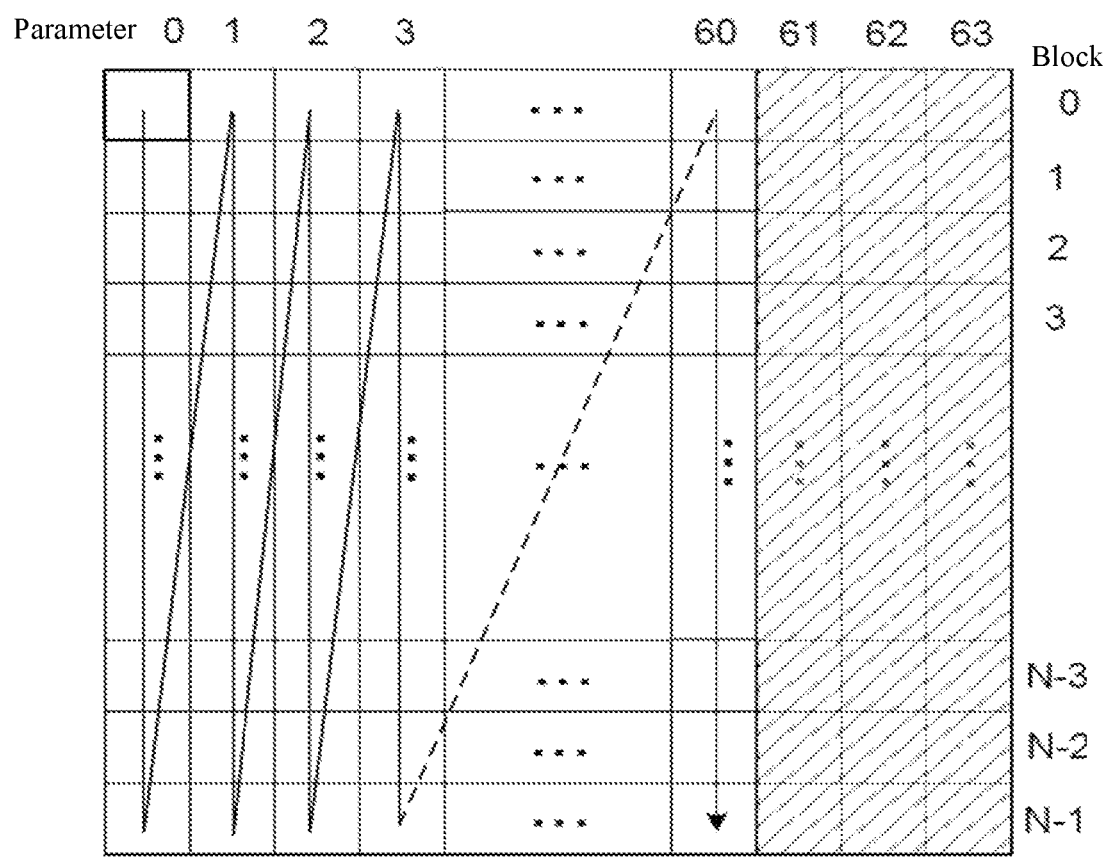
FIG. 5 is a schematic illustration of removing a high-frequency parameter, according to an example embodiment.

As shown in FIG. 5, in some embodiments, if the value of the cut-off parameter is set as 60, then all of the parameter having values greater than 60 will be treated as 0.

The method for controlling the data rate of the present disclosure determines the encoding parameter based on the quota. The disclosed method may suitably adjust the encoding parameter. Therefore, the disclosed method can effectively and efficiently control the data rate.

The above describe the method of controlling the data rate. In the following, embodiments of a computer system and a device for controlling the data rate will be described.

Figure 6:
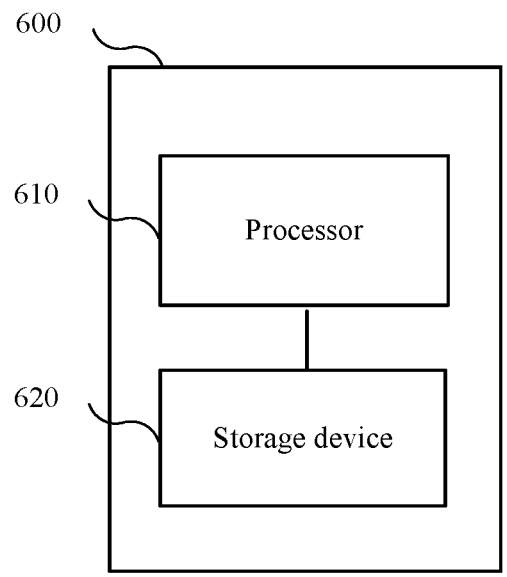
FIG. 6 is a schematic diagram of a computer system, according to an example embodiment.

FIG. 6 is a schematic diagram of a computer system 600. As shown in FIG. 6, the computer system 600 may include a processor 610 and a storage device 620.

It is understood that the computer system 600 may include other components included in a computer system, such as input and output devices, communication interfaces and adapters, etc. The present disclosure does not limit the components included in the computer system 600.

In some embodiments, the storage device 620 may be configured to store computer-executable instructions or codes.

In some embodiments, the storage device 620 may include various types of storage devices, such as random access memory ("RAM"), non-volatile memory, a magnetic storage device, etc. The present disclosure does not limit the types of the storage device 620.

In some embodiments, the processor 610 may be configured to access the storage device 620, and to execute the computer-executable instructions or codes stored therein to perform the methods for controlling the data rate disclosed herein.

In some embodiments, the processor 610 may include an ARM processor, a FPGA processor, a CPU, a GPU, etc. The present disclosure does not limit the type of the processor 610.

Figure 7:
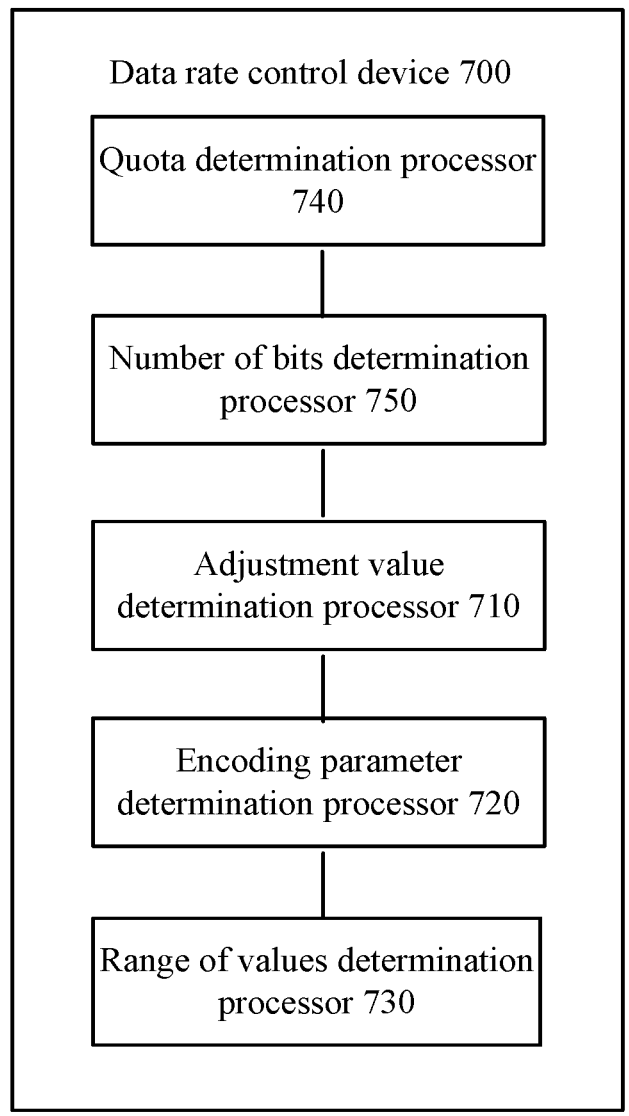
FIG. 7 is a schematic diagram of a device for controlling the data rate, according to an example embodiment.

FIG. 7 is a schematic diagram of a device 700 for controlling the data rate. The device 700 may be configured to perform the methods disclosed herein for controlling the data rate. The device 700 may be disposed in the system 100. For example, the device 700 may be the data rate controller 106 shown in FIG. 1.

As shown in FIG. 7, the device 700 may include:

an adjustment value determination processor 710 configured to determine the adjustment value of the first encoding parameter used for encoding the first strip based on the quota of the first strip that has not been encoded in the frame and the quota of at least one already encoded strip in the frame. The quotas relate to the number of shares of bits used for encoding a strip;

an encoding parameter determination processor 720 configured to determine the first encoding parameter based on the adjustment value.

The device for controlling the data rate may determine the encoding parameter based on the quota. The device may adjust the encoding parameter at a suitable time, thereby effectively controlling the data rate.

In some embodiments, the adjustment determination processor 710 may be configured to:

determine the adjustment value based on the quota of the first strip and a quota of at least one already encoded strip adjacent the first strip.

In some embodiments, the adjustment value determination processor 710 may be configured to:

when at least one of a strip located to the left of the first strip and a strip located above the first strip satisfies a first condition, determine the adjustment value based on the quota of the first strip and a quota of at least one of the strip located to the left of the first strip and the strip located above the first strip.

In some embodiments, when the strip located to the left of the first strip satisfies the first condition, it indicates that the first strip is not the very first strip (number one strip) in the strip row in which the first strip is located.

In some embodiments, when the strip located above the first strip satisfies the first condition, it indicates that the strip row in which the first strip is located is not a first strip row, and When the first strip is a non-noise strip, the strip row above the first strip is a non-noise strip row; or when the first strip is a noise strip, the strip row above the first strip is a noise strip row.

In some embodiments, the adjustment value determination processor 710 may be configured to:

determine the adjustment value to be a first predetermined value when the quota of the first strip is 0, and when the quotas of the strip located to the left of the first strip and the strip located above the first strip are both not 0.

In some embodiments, when the number of bits used by the already encoded strips in the frame is greater than the allocated number of bits assigned to the already encoded strips in the frame, then the first predetermined value is greater than 0; when the number of bits used by the already encoded strips in the frame is not greater than the allocated number of bits assigned to the already encoded strips in the frame, then the first predetermined value is not greater than 0; or determine the adjustment value to be a second predetermined value when the quota of the first strip is not 0, and the quotas of the strip located to the left of the first strip and the strip located above the first strip are both 0.

In some embodiments, when the number of bits used by already encoded strips in the frame is greater than the allocated number of bits assigned to the already encoded strips in the frame, the second predetermined value is greater than 0; when the number of bits used by the already encoded strips in the frame is not greater than the allocated number of bits assigned to the already encoded strips in the frame, the second predetermined value is not greater than 0.

In some embodiments, the adjustment value determination processor 710 may be configured to:

when the quota of the first strip is not 0, and when the quota of at least one of the strip located to the left of the first strip and the strip located above the first strip is not 0, determine the adjustment value based on the quota of the first strip, the quota of and the number of bits used by at least one of the strip located to the left of the first strip and the strip located above the first strip whose quota is not 0.

In some embodiments, the adjustment value determination processor 710 may be configured to:

when the quotas of the strip located to the left of the first strip and the strip located above the first strip are both not 0, determine an encoding parameter predicted value based on the quota of the first strip, the number of bits that may be used by the first strip, the quotas of and the numbers of bits used by the strip located to the left of the first strip and the strip located above the first strip, and the encoding parameter used to encode the strip located to the left of the first strip and the strip located above the first strip; or when the quota of the strip located to the left of the first strip is not 0, and the quota of the strip located above the first strip is 0, determine the encoding parameter predicted value based on the quota of the first strip, the number of bits that may be used by the first strip, the quota of and the number of bits used by the strip located to the left of the first strip, and the encoding parameter used for encoding the strip located to the left of the first strip; or when the quota of the strip located above the first strip is not 0, and the quota of the strip located to the left of the first strip is 0, determine the encoding parameter predicted value based on the quota of the first strip, the number of bits that may be used by the first strip, the quota of and the number of bits used by the strip located above the first strip, and the encoding parameter used for encoding the strip located above the first strip;

determine the adjustment value based on the encoding parameter predicted value and a second encoding parameter used for encoding a second strip, where the second strip is the last strip in the already encoded strips in the frame.

In some embodiments, the adjustment value determination processor 710 may be configured to:

when the quota of the first strip is 0, and when the quota of at least one of the strip located to the left of the first strip and the strip located above the first strip is 0, determine the adjustment value based on the number of bits used by at least one of the strip located to the left of the first strip and the strip located above the first strip whose quota is 0.

In some embodiments, the adjustment value determination processor 710 may be configured to:

when the quotas of the strip located to the left of the first strip and the strip located above the first strip are both 0, determine the encoding parameter predicted value based on the number of bits that may be used by the first strip, the number of bits used by the strip located to the left of the first strip and the strip located above the first strip, and the encoding parameter(s) used for encoding the strip located to the left of the first strip and the strip located above the first strip; or when the quota of the strip located to the left of the first strip is 0, and the quota of the strip located above the first strip is not 0, determine the encoding parameter predicted value based on the number of bits that may be used by the first strip, the number of bits used by the strip located to the left of the first strip, and the encoding parameter used by the strip located to the left of the first strip; or when the quota of the strip located above the first strip is 0, and the quota of the strip located to the left of the first strip is not 0, determine the encoding parameter predicted value based on the number of bits that may be used by the first strip, the number of bits used by the strip located above the first strip, and the encoding parameter used for encoding the strip located above the first strip;

determine the adjustment value based on the encoding parameter predicted value and the second encoding parameter used for encoding the second strip, where the second strip is the last strip in the already encoded strips in the frame.

In some embodiments, the encoding parameter determination processor 720 may be configured to:

determine the first encoding parameter based on the adjustment value and the second encoding parameter. The second encoding parameter may be an encoding parameter used for encoding the second strip. The second strip may be the last strip of the already encoded strips in the frame.

In some embodiments, the first encoding parameter may be the sum of the second encoding parameter and the adjustment value.

In some embodiments, when the number of strips having not been encoded in the frame is not greater than a third predetermined value, and when the number of bits used by the already encoded strips in the frame is greater than the allocated number of bits assigned to the already encoded strips in the frame, then the first encoding parameter is determined as a sum of the second encoding parameter, the adjustment value, and a fourth predetermined value that is greater than 0.

In some embodiments, the encoding parameter determination processor 720 may be configured to:

limit the first encoding parameter to be within a predetermined range of values for encoding parameters when the first encoding parameter falls out of the range of values for the encoding parameters.

In some embodiments, the device 700 may include:

a range of value determination processor 730 configured to adjust the range of values for the encoding parameters based on a result of encoding.

In some embodiments, the device 700 may include:

a quota determination processor 740 configured to determine the quota of each strip included in the frame.

In some embodiments, the quota determination processor 702 may be configured to:

determine the quota for each strip included in the frame based on the characteristics of the data in each strip included in the frame.

In some embodiments, the quota of each strip and the characteristics of data of each strip may have a forward mapping relationship.

In some embodiments, the device 700 may include:

a number of bits determination processor 750 configured to determine the number of bits corresponding to each quota.

In some embodiments, the number of bits determination processor 750 may be configured to:

when the frame includes a noise strip, determine the number of bits corresponding to each quota of the noise strip included in the frame based on the number of bits that may be used for encoding all of the noise strips included in the frame in the allocated number of bits assigned to the frame, a sum of the quotas of all of the noise strips included in the frame, and the number of noise strips in the frame whose quotas are 0;

determine the number of bits corresponding to each quota of the non-noise strip included in the frame based on the number of bits that may be used for encoding all of the non-noise strips in the frame in the allocated number of bits assigned to the frame, a sum of the quotas of all of the non-noise strips in the frame, and the number of non-noise strips in the frame whose quotas are 0.

In some embodiments, the number of bits determination processor 750 may be configured to:

When the frame does not include a noise strip, determine the number of bits corresponding to each quota based on the number of bits allocated to the frame, a sum of the quotas of all of the non-noise strips included in the frame, and number of non-noise strips in the frame whose quotas are 0.

In some embodiments, the number of bits determination processor 750 may be configured to:

when the frame does not include a noise strip, determine a number of bits for encoding each zero strip included in a zero strip row in the frame to be an eleventh predetermined value;

determine the number of bits corresponding to each quota based on the number of bits allocated to the frame, the number of bits used for encoding the zero strips of all of the zero strip rows in the frame, the number of zero strips in all of the zero strip rows of the frame, a sum of the quotas of all of the non-noise strips in the frame, and the number of non-noise strips in the frame whose quotas are 0.

In some embodiments, the encoding parameter determination processor 720 may be configured to determine an initial encoding parameter.

In some embodiments, the range of values determination processor 730 may be configured to determine a range of values for the initial encoding parameter.

In some embodiments, the encoding parameter determination processor 720 may be configured to:

determine the initial encoding parameter to be a third encoding parameter used for encoding a third strip when a strip located to the left of the third strip that has not been encoded in the frame and a strip located above the third strip both satisfy a second condition.

In some embodiments, when the strip located to the left of the third strip satisfies the second condition, it indicates that the third strip is the very first strip (number one strip) in a strip row in which the third strip is located.

In some embodiments, when the strip located above the third strip satisfies the second condition, it indicates that the strip tow in which the third strip is located is the very first strip row of the frame; or when the third strip is a non-noise strip, the strip row above the third strip is a noise strip row; or when the third strip is a noise strip, the strip row above the third strip is a non-noise strip row.

In some embodiments, the computer system and the device for controlling the data rate may be the entities for executing the disclosed methods for controlling the data rate. Various components or elements included in the computer system and the device for controlling the data rate may be configured to perform functions and operations to realize various steps of the disclosed methods.

In some embodiments, the present disclosure also provides a computer storage medium configured to store computer program codes. The program codes may instruct various hardware (e.g., processors) to execute the disclosed methods for controlling the data rate.

A person having ordinary skill in the art can appreciate that when the term "and/or" is used, the term describes a relationship between related items. The term "and/or" means three relationships may exist between the related items. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C.

A person having ordinary skill in the art can appreciate that part or all of the above disclosed methods and processes may be implemented using related electrical hardware, or a combination of electrical hardware and computer software that may control the electrical hardware. To illustrate the exchangeability of the hardware and software, in the above descriptions, the configurations and steps of the various embodiments have been explained based on the functions performed by the hardware and/or software. Whether the implementation of the functions is through hardware or software is to be determined based on specific application and design constraints. A person of ordinary skill in the art may use different methods to implement the functions for different applications. Such implementations do not fall outside of the scope of the present disclosure.

A person having ordinary skill in the art can appreciate that descriptions of the functions and operations of the system, device, and unit can refer to the descriptions of the disclosed methods.

A person having ordinary skill in the art can appreciate that the various system, device, and method illustrated in the example embodiments may be implemented in other ways. For example, the disclosed embodiments for the device are for illustrative purpose only. Any division of the units are logic divisions. Actual implementation may use other division methods. For example, multiple units or components may be combined, or may be integrated into another system, or some features may be omitted or not executed. Further, couplings, direct couplings, or communication connections may be implemented using indirect coupling or communication between various interfaces, devices, or units. The indirect couplings or communication connections between interfaces, devices, or units may be electrical, mechanical, or any other suitable type.

In the descriptions, when a unit or component is described as a separate unit or component, the separation may or may not be physical separation. The unit or component may or may not be a physical unit or component. The separate units or components may be located at a same place, or may be distributed at various nodes of a grid or network. The actual configuration or distribution of the units or components may be selected or designed based on actual need of applications.

Various functional units or components may be integrated in a single processing unit, or may exist as separate physical units or components. In some embodiments, two or more units or components may be integrated in a single unit or component. The integrated unit may be realized using hardware or a combination of hardware and software.

If the integrated units are realized as software functional units and sold or used as independent products, the integrated units may be stored in a computer-readable storage medium. Based on such understanding, the portion of the technical solution of the present disclosure that contributes to the current technology, or some or all of the disclosed technical solution may be implemented as a software product. The computer software product may be storage in a non-transitory storage medium, including instructions or codes for causing a computing device (e.g., personal computer, server, or network device, etc.) to execute some or all of the steps of the disclosed methods. The storage medium may include any suitable medium that can store program codes or instruction, such as at least one of a U disk (e.g., flash memory disk), a mobile hard disk, a read-only memory ("ROM"), a random access memory ("RAM"), a magnetic disk, or an optical disc.

A person having ordinary skill in the art can appreciate that the above embodiments are only examples of the present disclosure, and do not limit the scope of the present disclosure. Other embodiments of the present disclosure will be apparent to those skilled in the art from consideration of the specification and practice of the embodiments disclosed herein. It is intended that the specification and examples be considered as example only and not to limit the scope of the present disclosure, with a true scope and spirit of the invention being indicated by the following claims. Variations or equivalents derived from the disclosed embodiments also fall within the scope of the present disclosure.

What is claimed is:

1. A data rate control method, comprising:
   determining whether at least one of a plurality of encoded strips that are adjacent to an unencoded strip in a frame satisfies a condition, the plurality of encoded strips including an encoded strip located to the left of the unencoded strip and an encoded strip located above the unencoded strip, wherein:
      the encoded strip located to the left of the unencoded strip satisfying the condition indicates that the unencoded strip is not a number one strip in a strip row in which the unencoded strip is located; and
      the encoded strip located above the unencoded strip satisfying the condition indicates that the strip row in which the unencoded strip is located is not a number one strip row in the frame, and when the unencoded strip is a non-noise strip, a strip row located above the unencoded strip is a non-noise strip row, or when the unencoded strip is a noise strip, the strip row located above the unencoded strip is a noise strip row;
   based on a determination that the at least one of the plurality of encoded strips satisfies the condition, determining an adjustment value of an encoding parameter for encoding the unencoded strip based on a quota of the unencoded strip and based on a quota of at least one of the encoded strip located to the left of the unencoded strip and the encoded strip located above the unencoded strip, at least one of the quota of the unencoded strip and the quota of the at least one of the encoded strip located to the left of the unencoded strip and the encoded strip located above the unencoded strip relating to a number of shares of bits used for encoding a strip; and
   determining the encoding parameter based on the adjustment value.

2. The data rate control method of claim 1, wherein determining the adjustment value comprises:
   based on a determination that the quota of the unencoded strip is zero, and that a quota of the encoded strip located to the left of the unencoded strip and a quota of the encoded strip located above the unencoded strip are not zero, determining the adjustment value to be a first predetermined value, wherein when a number of bits accumulated by encoded strips in the frame is greater than a number of bits allocated to the encoded strips in the frame, the first predetermined value is greater than zero, and wherein when the number of bits accumulated by the encoded strips in the frame is not greater than the number of bits allocated to the encoded strips in the frame, the first predetermined value is not greater than zero; or
   based on a determination that the quota of the unencoded strip is not zero, and that the quota of the encoded strip located to the left of the unencoded strip and the quota of the encoded strip located above the unencoded strip are both zero, determining the adjustment value to be a second predetermined value, wherein when the number of bits accumulated by the encoded strips in the frame is greater than the number of bits allocated to the encoded strips in the frame, the second predetermined value is greater than zero, and wherein when the number of bits accumulated by the encoded strips in the frame is not greater than the number of bits allocated to the encoded strips in the frame, the second predetermined value is not greater than zero; or
   based on a determination that the quota of the unencoded strip is not zero, and that at least one of the quota of the encoded strip located to the left of the unencoded strip and the quota of the encoded strip located above the unencoded strip is not zero, determining the adjustment value based on the quota of the unencoded strip, a number of bits used by the at least one of the encoded strip located to the left of the unencoded strip and the encoded strip located above the unencoded strip having a non-zero quota, and the non-zero quota; or
   based on a determination that the quota of the unencoded strip is zero, and the quota of at least one of the encoded strip located to the left of the unencoded strip and the encoded strip located above the unencoded strip is zero, determining the adjustment value based on a number of bits used by the at least one of the encoded strip located to the left of the unencoded strip and the encoded strip located above the unencoded strip, which has a zero quota.

3. The data rate control method of claim 2, wherein determining the adjustment value based on the quota of the unencoded strip, the number of bits used by the at least one of the encoded strip located to the left of the unencoded strip and the encoded strip located above the unencoded strip having a non-zero quota, and the non-zero quota comprises:

based on a determination that the quotas of the encoded strip located to the left of the unencoded strip and the encoded strip located above the unencoded strip are not zero, and based on the quota of the unencoded strip, a number of bits usable by the unencoded strip, quotas of the encoded strip located to the left of the unencoded strip and the encoded strip located above the unencoded strip, numbers of bits used by the encoded strip located to the left of the unencoded strip and the encoded strip located above the unencoded strip, and an encoding parameter for encoding the encoded strip located to the left of the unencoded strip and the encoded strip located above the unencoded strip, determining an encoding parameter predicted value; or based on a determination that the quota of the encoded strip located to the left of the unencoded strip is not zero, and that the quota of the encoded strip located above the unencoded strip is zero, and based on the quota of the unencoded strip, a number of bits usable by the unencoded strip, the quota of the encoded strip located to the left of the unencoded strip, a number of bits used by the encoded strip located to the left of the unencoded strip, and an encoding parameter for encoding the encode strip located to the left of the unencoded strip, determining the encoding parameter predicted value; or based on a determination that the quota of the encoded strip located above the unencoded strip is not zero, and that the quota of the encoded strip located to the left of the unencoded strip is zero, and based on the quota of the unencoded strip, the number of bits that usable by the unencoded strip, the quota of the encoded strip located above the unencoded strip, a number of bits used by the encoded strip located above unencoded strip, and an encoding parameter for encoding the encoded strip located above the unencoded strip, determining the encoding parameter predicted value; and determining the adjustment value based on the encoding parameter predicted value and a encoding parameter for encoding a last encoded strip in the encoded strips included in the frame.

4. The data rate control method of claim 2, wherein determining the adjustment value based on the number of bits used by the at least one of the encoded strip located to the left of the unencoded strip and the encoded strip located above the unencoded strip, which has the zero quota, comprises:

based on a determination that quotas of both of the encoded strip located to the left of the unencoded strip and the encoded strip located above the unencoded strip are zero, and based on a number of bits usable by the unencoded strip, numbers of bits used by the encoded strip located to the left of the unencoded strip and the encoded strip located above the unencoded strip, and encoding parameters for encoding the encoded strip located to the left of the unencoded strip and the encoded strip located above the unencoded strip, determining an encoding parameter predicted value; or based on a determination that the quota of the encoded strip located to the left of the unencoded strip is zero, the quota of the encoded strip located above the unencoded strip is not zero, and based on the number of bits usable by the unencoded strip, a number of bits used by the encoded strip located to the left of the unencoded strip, and an encoding parameter for encoding the encoded strip located to the left of the unencoded strip, determining the encoding parameter predicted value; or based on a determination that the quota of the encoded strip located above the unencoded strip is zero, the quota of the encoded strip located to the left of the unencoded strip is not zero, and based on the number of bits usable by the unencoded strip, a number of bits used by the encoded strip located above the unencoded strip, and an encoding parameter for encoding the encoded strip located above the unencoded strip, determining the encoding parameter predicted value; and determining the adjustment value based on the encoding parameter predicted value and a encoding parameter for encoding a last encoded strip in the encoded strips included in the frame.

5. The data rate control method of claim 1, wherein:
the encoding parameter is a first encoding parameter; and
determining the first encoding parameter based on the adjustment value comprises:
determining the first encoding parameter based on the adjustment value and a second encoding parameter, wherein the second encoding parameter is an encoding parameter for encoding a last strip in encoded strips included in the frame.

6. The data rate control method of claim 5,
wherein the first encoding parameter is a sum of the second encoding parameter and the adjustment value, and
wherein if a number of unencoded strips in the frame is not greater than a third predetermined value, and if a number of bits accumulated by the encoded strips in the frame is greater than an allocated number of bits assigned to the encoded strips in the frame, then the first encoding parameter is determined as a sum of the second encoding parameter, the adjustment value, and a fourth predetermined value that is greater than zero.

7. The data rate control method of claim 5, further comprising:
based on a determination that the first encoding parameter falls out of a predetermined range of values for the first encoding parameter, limiting the first encoding parameter to be within the predetermined range of values.

8. The data rate control method of claim 7, wherein before determining the first encoding parameter, the method further comprises adjusting the predetermined range of values for the first encoding parameter based on a result of encoding.

9. The data rate control method of claim 8, wherein adjusting the predetermined range of values for the first encoding parameter comprises:
during an encoding process of the frame, based on a determination that there is a continuous occurrence of a situation where the number of bits accumulated by the encoded strips is smaller than a number of bits allocated to the encoded strips in the frame, reducing a lower limit of the predetermined range of values for the first encoding parameter by a fifth predetermined value; or
during the encoding process of the frame, based on a determination that there is a continuous occurrence of a situation where the number of bits accumulated by the encoded strips is greater than the number of bits allocated to the encoded strips in the frame, increasing an upper limit of the predetermined range of values by a seventh predetermined value.

10. The data rate control method of claim 1, further comprising:
determining a quota for each strip included in the frame.

11. The data rate control method of claim 10, wherein determining the quota for each strip included in the frame comprises:
determining the quota for each strip of the frame based on characteristics of data of each strip of the frame; or
determining the quota for each strip of the frame based on a location of each strip in the frame or pre-configured information.

12. The data rate control method of claim 10, further comprising:
determining a number of bits corresponding to each quota.

13. The data rate control method of claim 12,
wherein when the frame includes noise strips:
determining the number of bits corresponding to each quota of each noise strip included in the frame based on a number of bits usable for encoding all of the noise strips included in the frame in an allocated number of bits assigned to the frame, a sum of quotas of all of the noise strips included in the frame, and a number of noise strips in the frame having zero quotas; and
determining the number of bits corresponding to each quota of each non-noise strip included in the frame based on a number of bits usable for encoding all of non-noise strips in the frame in an allocated number of bits assigned to the frame, a sum of the quotas of all of the non-noise strips in the frame, and a number of non-noise strips in the frame having zero quotas,
wherein when the frame does not include a noise strip:
determining the number of bits corresponding to each quota based on a number of bits allocated to the frame, a sum of quotas of all of the non-noise strips included in the frame, and the number of non-noise strips in the frame having zero quotas, and wherein when the frame does not include a non-noise strip;
determining a number of bits for encoding each zero strip included in a zero strip row in the frame to be a tenth predetermined value; and
determining the number of bits corresponding to each quota based on the number of bits allocated to the frame, a number of bits used for encoding zero strips of all zero strip rows in the frame, a number of zero strips in all of the zero strip rows of the frame, a sum of quotas of all of the non-noise strips in the frame, and a number of non-noise strips in the frame having zero quotas.

14. The data rate control method of claim 1, further comprising:
determining an initial encoding parameter.

15. The data rate control method of claim 1, further comprising:
determining a range of values for an initial encoding parameter.

16. The data rate control method of claim 1,
wherein the unencoded strip is a first unencoded strip, the condition is a first condition, the encoding parameter is a first encoding parameter,
the method further comprising:
based on a determination that an encoded strip located to the left of a second unencoded strip in the frame and an encoded strip located above the second unencoded strip both satisfy a second condition, determining a second encoding parameter used for encoding the second unencoded strip to be an initial encoding parameter,
wherein the encoded strip to the left of the second unencoded strip satisfying the second condition indicates that the second unencoded strip is a number one strip in a strip row in which the second unencoded strip is located, and
wherein the encoded strip located above the second unencoded strip satisfying the second condition indicates that the strip row in which the second unencoded strip is located is a number one strip row in the frame, or when the second unencoded strip is a non-noise strip, a strip row located above the second unencoded strip is a noise strip row, or when the second unencoded strip is a noise strip, the strip row located above the second unencoded strip is a non-noise strip row.

17. The data rate control method of claim 1, further comprising:
based on a determination that an average value of complexities of strips included in a first strip row of the frame is greater than a fifteenth predetermined value, and that a number of strips included in the first strip row that have complexities greater than a sixteenth predetermined value is greater than a seventeenth predetermined value, determining that the first strip row is a noise strip row, and strips included in the noise strip row are noise strips;
based on a determination that the average value of the complexities of strips included in the first strip row is not greater than the fifteenth predetermined value, or that the number of strips included in the first strip row that have complexities greater than the sixteenth predetermined value is not greater than the seventeenth predetermined value, or that the average value of the complexities is not greater than the fifteenth predetermined value and that the number of strips included in the first strip row that have complexities greater than the sixteenth predetermined value is not greater than the seventeenth predetermined value, determining that the first strip row is a non-noise strip row, and strips included in the non-noise strip row are non-noise strips;
based on a determination that a complexity of a fourth strip in the non-noise strip row is greater than an eighteenth predetermined value, the eighteenth predetermined value being not smaller than the sixteenth predetermined value, determining that the fourth strip is a non-noise strip including regular high-frequency components; and
based on a determination that a complexity of each strip in the non-noise strip row is zero, determining that the non-noise strip row is a zero strip row, and strips included in the zero strip row are zero strips.

18. A computer system, comprising:
a storage device configured to store computer-executable instructions; and
a processor configured to access the storage device and to execute the computer-executable instructions to perform a plurality of operations, the operations comprising:
determining whether at least one of a plurality of encoded strips that are adjacent to an unencoded strip in a frame satisfies a condition, the plurality of encoded strips including an encoded strip located to the left of the unencoded strip and an encoded strip located above the unencoded strip, wherein:

the encoded strip located to the left of the unencoded strip satisfying the condition indicates that the unencoded strip is not a number one strip in a strip row in which the unencoded strip is located; and the encoded strip located above the unencoded strip satisfying the condition indicates that the strip row in which the unencoded strip is located is not a number one strip row in the frame, and when the unencoded strip is a non-noise strip, a strip row located above the unencoded strip is a non-noise strip row, or when the unencoded strip is a noise strip, the strip row located above the unencoded strip is a noise strip row;

based on a determination that the at least one of the plurality of encoded strips satisfies the condition, determining an adjustment value of an encoding parameter for encoding the unencoded strip based on a quota of the unencoded strip and a quota of at least one of the encoded strip located to the left of the unencoded strip and the encoded strip located above the unencoded strip, at least one of the quota of the unencoded strip and the quota of the at least one of the encoded strip located to the left of the unencoded strip and the encoded strip located above the unencoded strip relating to a number of shares of bits used for encoding a strip; and determining the encoding parameter based on the adjustment value.

* * * * *